United States Patent [19]
Ishida

[11] Patent Number: 6,141,375
[45] Date of Patent: Oct. 31, 2000

[54] PLURAL SYNTHESIZER CONTROLLING SYSTEM FOR PERSONAL HANDYPHONE SYSTEM AND PLURAL SYNTHESIZER CONTROLLING METHOD

[75] Inventor: Takayasu Ishida, Shizuoka, Japan

[73] Assignee: NEC Corporation, Tokyo, Japan

[21] Appl. No.: 09/307,749

[22] Filed: May 10, 1999

[30] Foreign Application Priority Data

May 14, 1998 [JP] Japan .................. 10-132255

[51] Int. Cl.[7] ...................................................... H04B 1/38

[52] U.S. Cl. .............................. 375/219; 455/73; 455/76

[58] Field of Search ................................ 375/376, 213, 375/344, 295; 331/46, DIG. 2; 455/73, 76, 123, 257, 86, 183.1

[56] References Cited

U.S. PATENT DOCUMENTS 5,471,652  11/1995  Hulkko ....................................... 455/76
5,884,200  3/1999  Yamane et al. ............................ 455/575

*Primary Examiner*—Temesghen Ghebretinsae
*Attorney, Agent, or Firm*—Sughrue, Mion, Zinn, Macpeak & Seas, PLLC

[57] ABSTRACT

A modem IC controls latch enable terminals LE1 and LE2 through which PLL frequency synthesizer IC1 and IC2 control writing of frequency set data, makes the write timing different between the PLL frequency synthesizer ICs to allow writing of the frequency set data into two PLL frequency synthesizer ICs to be performed through the same control line, and produces a control signal to latch enable terminal LE2, which-controls writing of the frequency sent data into PLL frequency synthesizer IC2, from the other control signal by using an invertor and a NAND circuit.

6 Claims, 6 Drawing Sheets

PLURAL SYNTHESIZER CONTROLLING SYSTEM FOR PERSONAL HANDYPHONE SYSTEM AND PLURAL SYNTHESIZER CONTROLLING METHOD

BACKGROUND OF THE INVENTION

1. Field of the Invention

The present invention relates to a plural synthesizer controlling system for a personal handyphone system wherein the number of control lines from a modem IC to two 1st local units of a personal handyphone system (PHS) terminal adapted for 1-frame 2-slot transmission/reception is reduced and a plural synthesizer controlling method for the same.

2. Description of the Related Art

A local unit of a PHS terminal to which the present invention relates is used particularly for frequency conversion of transmission/reception.

A local unit of the type mentioned usually functions sufficiently if one 1st local unit is provided in a PHS terminal. In recent years, however, as popularization of mobile computing proceeds, high speed data communication is demanded also for mobile computing.

Therefore, in order that a PHS system which is high in transmission speed and is connected to an ISDN may allow high speed data communication up to 64 Kbps (kilo bit per second) which is the transmission speed of the ISDN, it operates to perform data communication by 1-frame 2-slot transmission/reception.

FIG. 1 shows a block diagram of a local unit adapted for two slots according to the prior art.

Since the prior art described above operates to perform data communication by 1-frame 2-slot transmission/reception, it is disadvantageous in that 1st local units must be prepared for two slots.

The prior art is disadvantageous also in that, since it includes two 1st local units, synthesizers of the local units must be controlled separately from each other, and this increases the number of control lines.

SUMMARY OF THE INVENTION

It is an object of the present invention to provide a plural synthesizer controlling system for a personal handyphone system wherein the number of control lines from a modem IC to two 1st local units in a PHS terminal adapted for 1-frame 2-slot transmission/reception is reduced and a plural synthesizer controlling method for the same.

According to an aspect of the present invention, there is provided a plural synthesizer controlling system for a personal handyphone system which comprises an antenna unit, a receiver, a transmitter, a local unit, a modem IC, and a CPU for processing data supplied thereto from the receiver through the modem IC and performs 1-frame 2-slot transmission/reception, the modem IC comprising means for setting frequency data to be used for transmission/reception to the local unit, the local unit comprising a first 1st local VCO, a second 1st local VCO, a 2nd local VCO, a 1st local switch for alternately outputting local inputs from the first 1st local VCO and the second 1st local VCO for each slot, a first PLL frequency synthesizer IC for controlling the first 1st local VCO and the 2nd local VCO with the frequency set data from the modem IC, a second PLL frequency synthesizer IC for controlling the second 1st local VCO with the frequency set data from the modem IC, an invertor for inverting a local switch output of the modem IC and inputting the inverted signal to a switch control of the 1st local switch, and a NAND circuit for NANDing the output of the invertor and an output of the modem IC for switching power supply to the first PLL frequency synthesizer ON and inputting the NAND signal to a second latch enable terminal through which the second PLL frequency synthesizer IC controls writing of the frequency set data.

The modem IC may comprise means connected to the first PLL frequency synthesizer IC and the second PLL frequency synthesizer IC for controlling a first latch enable terminal through which the first PLL frequency synthesizer IC controls writing of the frequency set data and a second latch enable terminal through which the second PLL frequency synthesizer IC controls writing of the frequency set data, making the write timing of the frequency set data different between the first PLL frequency synthesizer IC and the second PLL frequency synthesizer IC to allow writing of the frequency set data into the first PLL frequency synthesizer IC and the second PLL frequency synthesizer IC to be performed through the same control line, and producing a control signal to the second latch enable terminal from the other control signal by using the invertor and the NAND circuit.

The plural synthesizer controlling system for a personal handyphone system may further comprise means for writing, as a write timing of the frequency set data, the frequency set data into the first PLL frequency synthesizer IC before the signal for switching the power supply to the first PLL frequency synthesizer IC ON is controlled to the high level, and writing the frequency set data into the second PLL frequency synthesizer IC before the signal for switching the power supply to the second PLL frequency synthesizer IC ON is controlled to the high level.

According to another aspect of the present invention, there is provided a plural synthesizer controlling method for a plural synthesizer controlling system for a personal handyphone system comprises the steps of inverting the local switch output of the modem IC by the invertor and inputting the inverted signal to the switch control of the 1st local switch, NANDing the output of the invertor and the output of the modem IC for switching the power supply to the first PLL frequency synthesizer ON by the NAND circuit and inputting the NAND signal to the second latch enable terminal through which the second PLL frequency synthesizer IC controls writing of the frequency set data, setting frequency data to be used for transmission/reception to the local unit by the modem IC, controlling the first 1st local VCO and the 2nd local VCO with the frequency set data from the modem IC by the first PLL frequency synthesizer IC, controlling the second 1st local VCO with the frequency set data from the modem IC by the second PLL frequency synthesizer IC, and alternately outputting the local inputs from the first 1st local VCO and the second 1st local VCO for each slot by the 1st local switch.

The plural synthesizer controlling method for a plural synthesizer controlling system for a personal handyphone system may further comprise the steps performed by the modem IC of controlling the first latch enable terminal for controlling the first latch enable terminal through which the first PLL frequency synthesizer IC controls writing of the frequency set data and the second latch enable terminal through which the second PLL frequency synthesizer IC controls writing of the frequency set data, making the write timing of the frequency set data different between the first PLL frequency synthesizer IC and the second PLL frequency synthesizer IC to allow writing of the frequency set data into the first PLL frequency synthesizer IC and the second PLL frequency synthesizer IC to be performed through the same control line, and producing the control signal to the second latch enable terminal from the other control signal by using the invertor and the NAND circuit.

The plural synthesizer controlling method for a plural synthesizer controlling system for a personal handyphone system may further comprise the steps of, as a write timing of the frequency set data, writing the frequency set data into the first PLL frequency synthesizer IC before the signal for switching the power supply to the first PLL frequency synthesizer IC ON is controlled to the high level, and writing the frequency set data into the second PLL frequency synthesizer IC before the signal for switching the power supply to the second PLL frequency synthesizer IC ON is controlled to the high level.

In the construction that two PLL synthesizer circuits are used in order to allow transmission/reception of successive or adjacent slops in different frequencies, two PLL synthesizer ICs (hereinafter referred to simply as PLL ICs) and a modem IC for controlling the PLL synthesizer ICs are connected to each other in accordance with the present invention.

The modem IC controls latch enable terminals through which the PLL ICs control writing of frequency set data, makes write timings for the PLL ICs different from each other to allow writing of the frequency set data into the two PLL ICs with the same control line, and produces a control signal to the latch enable terminal, which controls writing of the frequency set data into one of the PLL ICs, from the other control signal by using an invertor and a NAND circuit. Consequently, the modem IC itself does not output the control signal and thereby prevents an increase of the number of terminals.

Accordingly, the number of control lines from the modem IC to the PLL ICs can be decreased. Consequently, an increase of the number of terminals of the modem IC can be minimized. Further, a printed circuit board for the modem IC can be simplified.

DETAILED DESCRIPTION OF THE PREFERRED EMBODIMENTS

Figure 1:
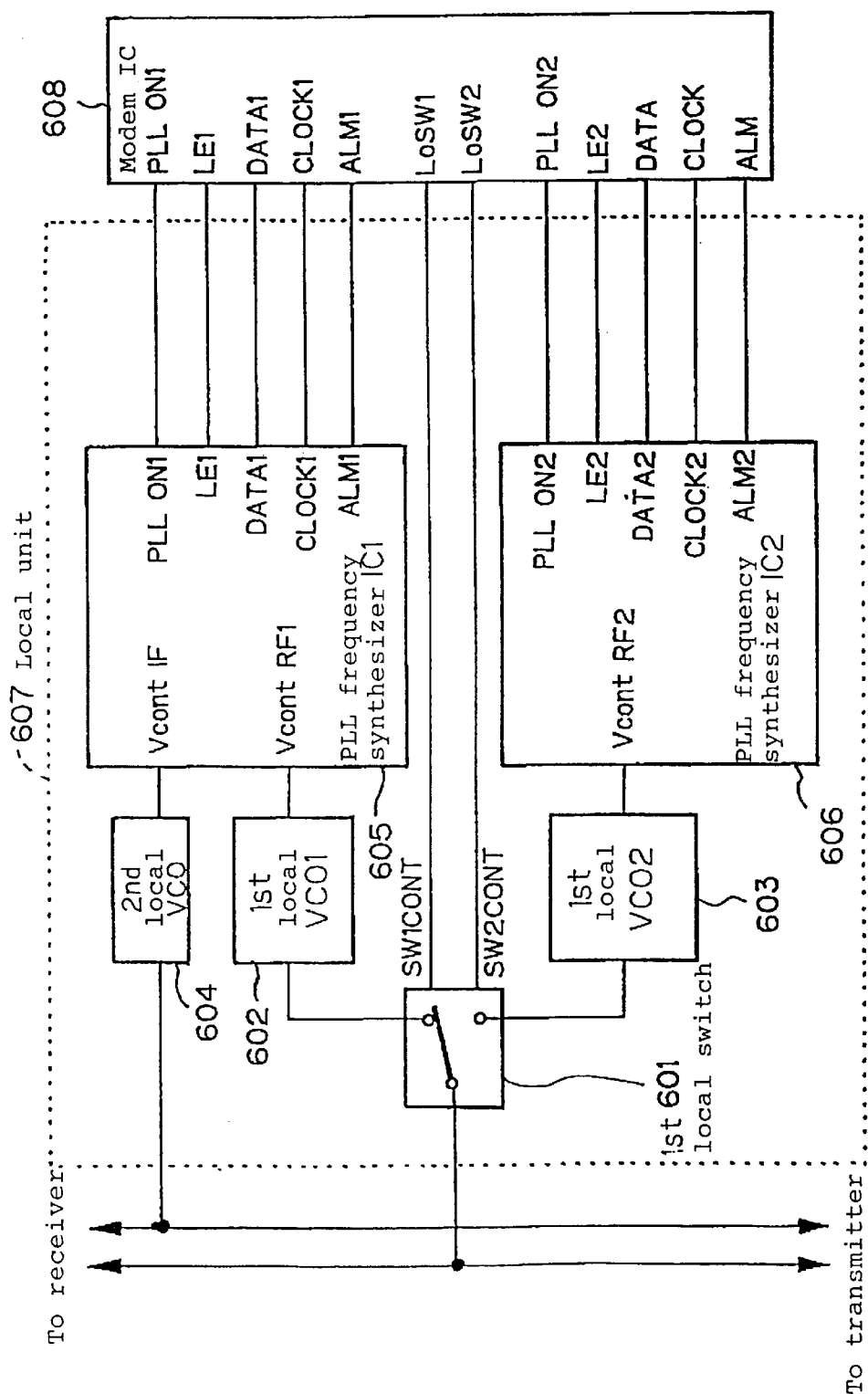
FIG. 1 is a block diagram of a local unit adapted for 2 slots according to the prior art.
Figure 2:
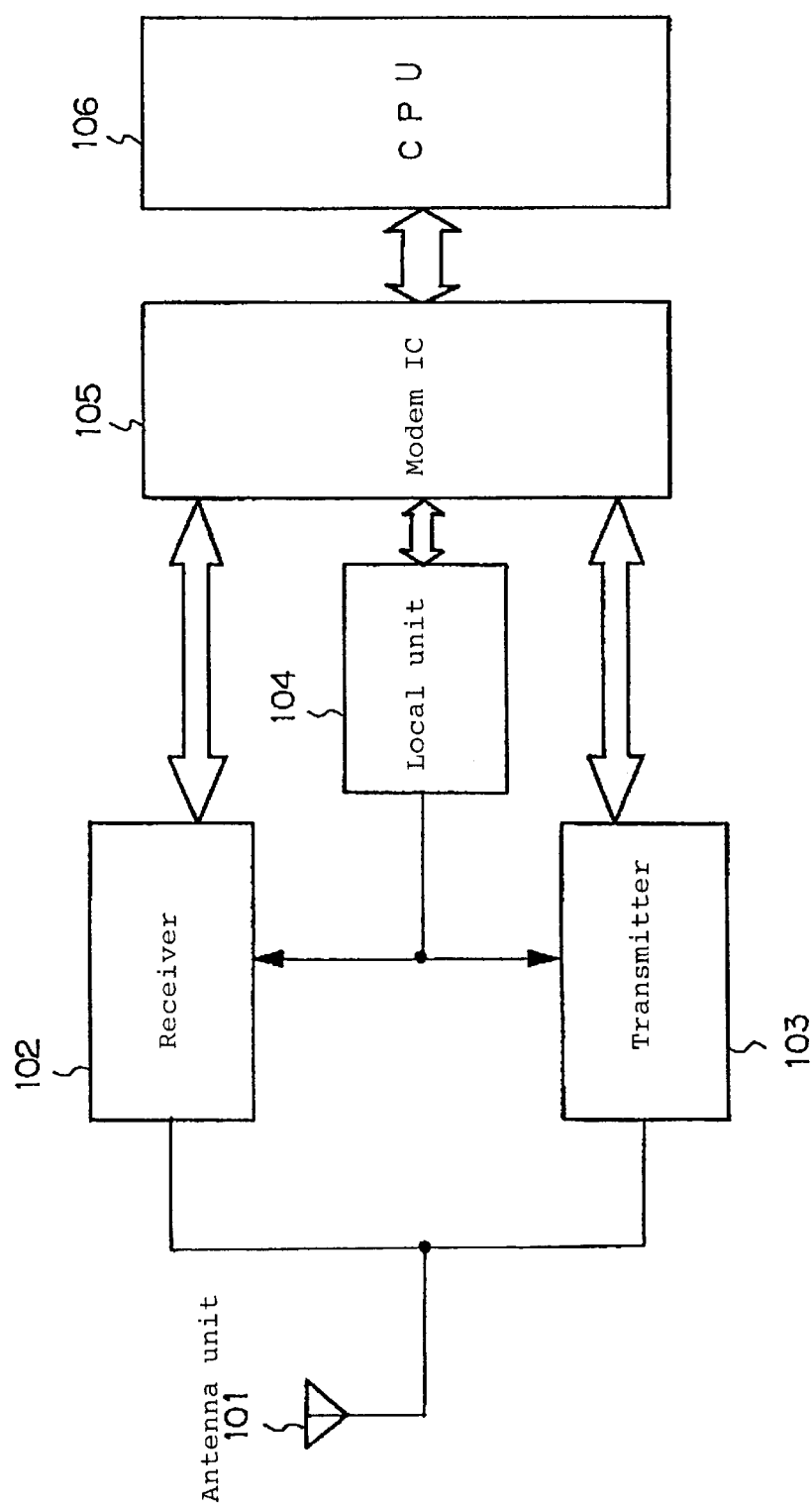
FIG. 2 is a transmission/reception block diagram of a PHS terminal as an embodiment of the present invention.

Referring to FIG. 2, there is shown a transmission/reception block diagram of a PHS terminal as an embodiment of the present invention. Receiver 102 and transmitter 103 have antenna unit 101. A signal (data) from receiver 102 is supplied through modem IC 105 to and processed by CPU 106. In order to perform 1-frame 2-slot transmission/reception, it is confirmed by utilizing a reception level that a base station in which the position of the PHS terminal is registered at present has two or more idle slots, and if such idle slots are confirmed, then the PHS terminal operates to establish a link for 1-frame 2-slot transmission/reception to the base station. For this process data, modem IC 105 which is provided in accordance with the present invention sets frequency data to be used for transmission/reception to local unit 104. Data obtained in this manner is supplied to a PLL IC of local unit 104 and outputted as a local frequency of receiver 102 and transmitter 103.

Figure 3:
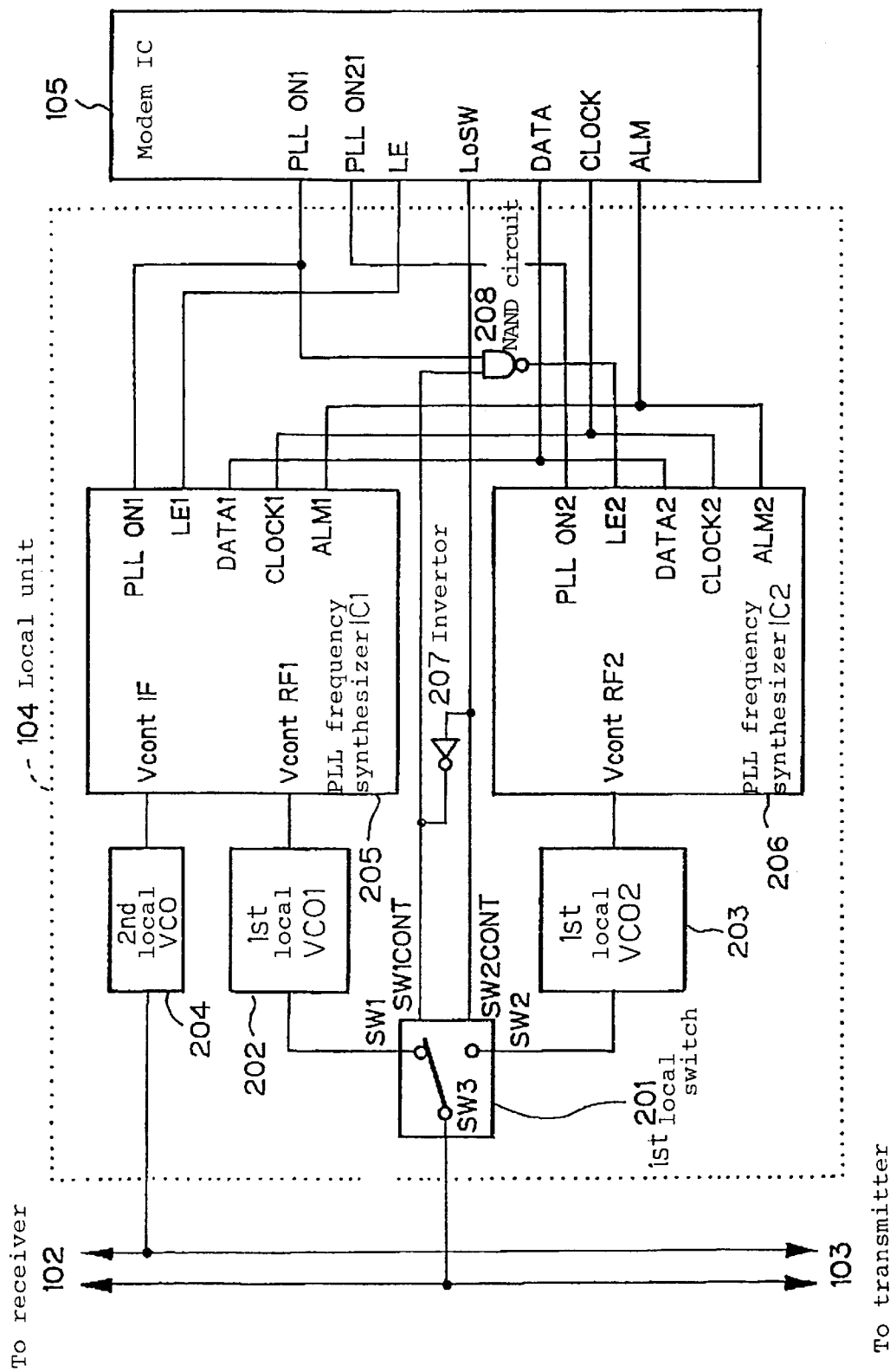
FIG. 3 is a block diagram of a local unit adapted for 2 slots in the embodiment of the present invention.

FIG. 3 is a block diagram of the local unit adapted for 2 slots in the embodiment of the present invention.

Referring to FIG. 3, local unit 104 of FIG. 2 is constructed in the following manner. In particular, in order to execute the processing described above, local unit 104 includes 1st local switch 201 for alternately outputting local inputs from two 1st local VCOs for each slot, 1st local VCO1 202 whose frequency is controlled by PLL frequency synthesizer IC1 205, 1st local VCO2 203 whose frequency is controlled by PLL frequency synthesizer IC2 206, 2nd local VCO 204, PLL frequency synthesizer IC1 205 for controlling 1st local VCO1 202 and 2nd local VCO 204 with frequency set data from modem IC 105, PLL frequency synthesizer IC2 206 for controlling 1st local VCO2 203 with frequency set data from modem IC 105, invertor 207 for inverting a local switch (LOSW) output of modem IC 105 and inputting the inverted signal to a switch control (SW1CONT) of 1st local switch 201, and NAND circuit 208 for NANDing the output of invertor 207 and a signal (PLL ON1) output of modem IC 105 for switching power supply to PLL frequency synthesizer IC1 205 ON and inputting the NAND signal to a second latch enable terminal (LE2) of PLL frequency synthesizer IC2 206.

Since contents of the frequency set data described above are well known to those skilled in the art and do not have a direct relation to the present invention, description of a detailed construction of the same is omitted herein.

Figure 4:
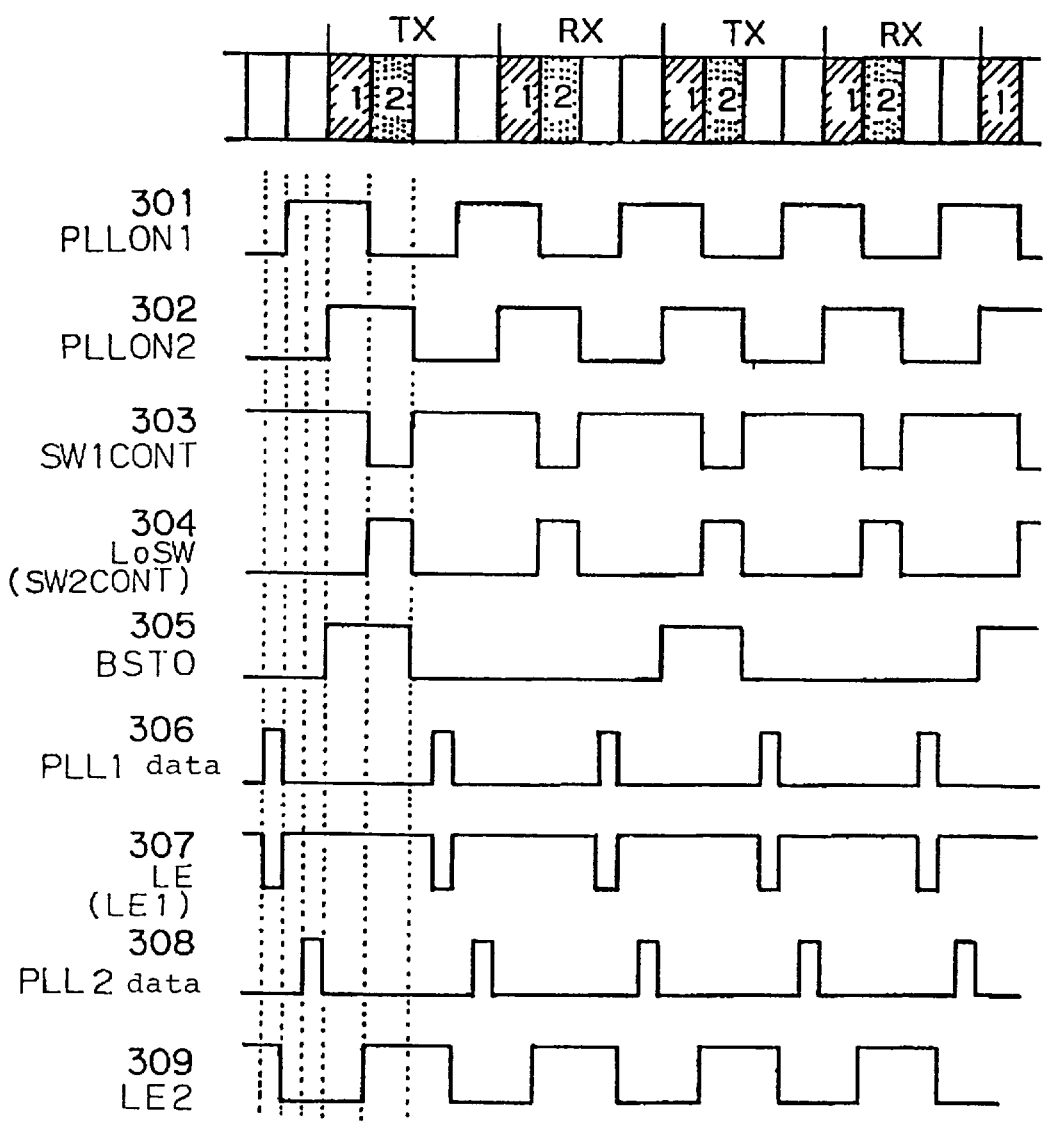
FIG. 4 is a timing chart upon transmission/reception of successive slots.

In the following, operation of the embodiment of the present invention will be described. First, operation in 2-slot transmission/reception will be described with reference to a timing chart upon transmission/reception of successive slots of FIG. 4. Since the operation here is a 2-slot transmission/reception operation of the PHS terminal, the PHS terminal may possibly transmit successive slots in different frequencies, and therefore, the PHS terminal includes two PLL ICs (205 and 206 in FIG. 3) and two 1st local VCOs (202 and 203 in FIG. 3). Taking a frequency fixing time of the PLL ICs into consideration, modem IC 105 starts up a signal (PLL ON1 301) for switching the power supply to PLL frequency synthesizer IC1 205 of modem IC 105 ON and another signal (PLL ON2 302) for switching the power supply to PLL frequency synthesizer IC2 206 of modem IC 105 ON at a slot prior by one slot to a transmission/reception slot. 1st local switch 201 outputs an input to SW1 when switch control (SW1CONT) 303 has the high level, but outputs an input to SW2 when switch control (SW2CONT) 304 has the high level. Intermittent transmission timing signal (BST) 305 indicates a timing of transmission.

A data write timing into PLL frequency synthesizer IC1 205 is provided by a timing of PLL1 data 306. In particular, writing of data is ended before PLL ON1 301 is controlled to the high level. For PLL frequency synthesizer IC1 205, an IC of the type which stores data when a first latch enable terminal (LE1) of PLL frequency synthesizer IC1 205 has the low level is used, and, the data write timing into PLL frequency synthesizer IC1 205 is controlled by modem IC 105 with LE signal 307. Consequently, even if a single data line is used by the two PLL ICs, data can be written correctly into both of the PLL ICs. PLL2 data 308 which is frequency set data for PLL frequency synthesizer IC2 206 is automatically sent later by one slot interval after PLL1 data 306 is sent because transmission/reception slots successively appear. LE2 309 which is an LE signal for PLL frequency synthesizer IC2 206 is obtained by NANDing PLL ON1 301 and SW2CONT 304 and has such a wave form as shown by 309 in FIG. 4. Since LE2 309 has the low level when PLL2 data 308 is inputted to modem IC 105, data storage into PLL frequency synthesizer IC2 206 is enabled.

Figure 5:
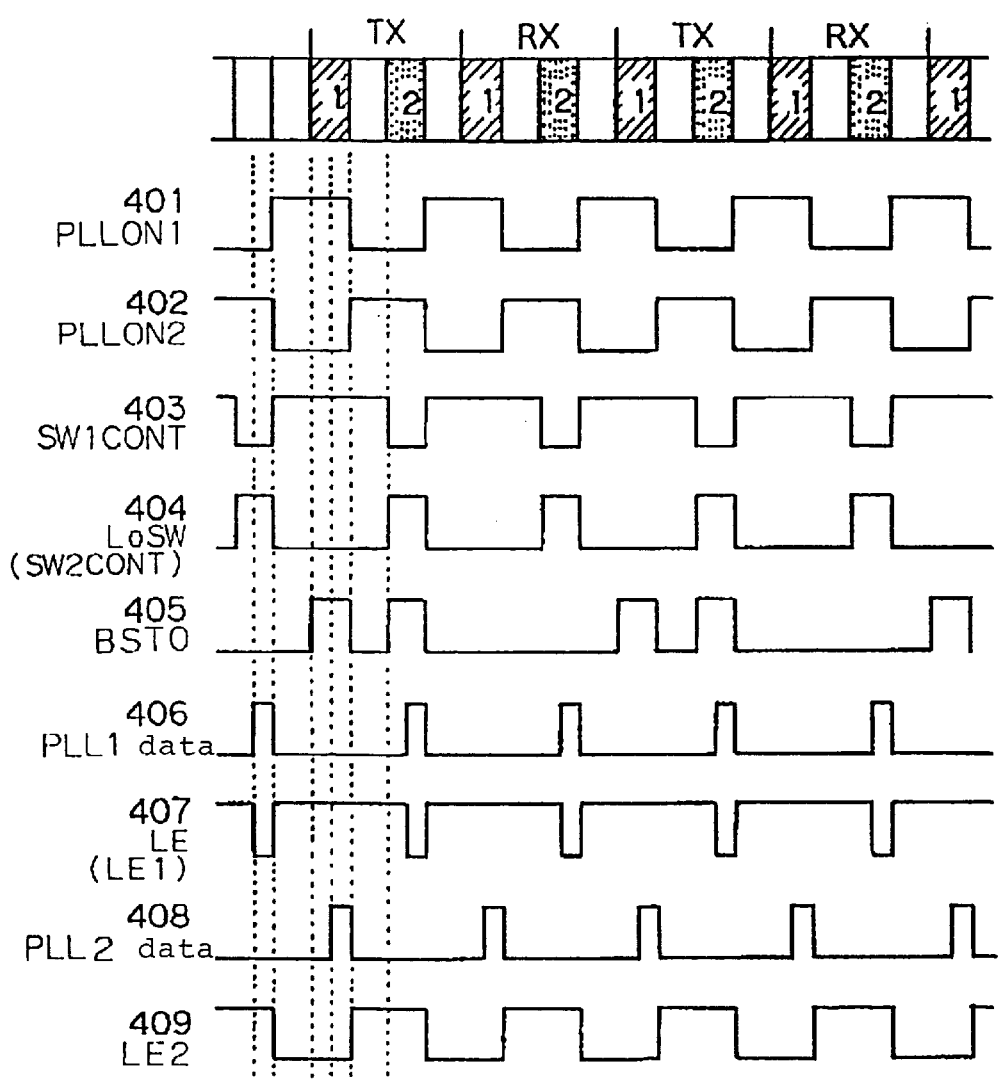
FIG. 5 is a timing chart upon transmission of every other slot.
Figure 6:
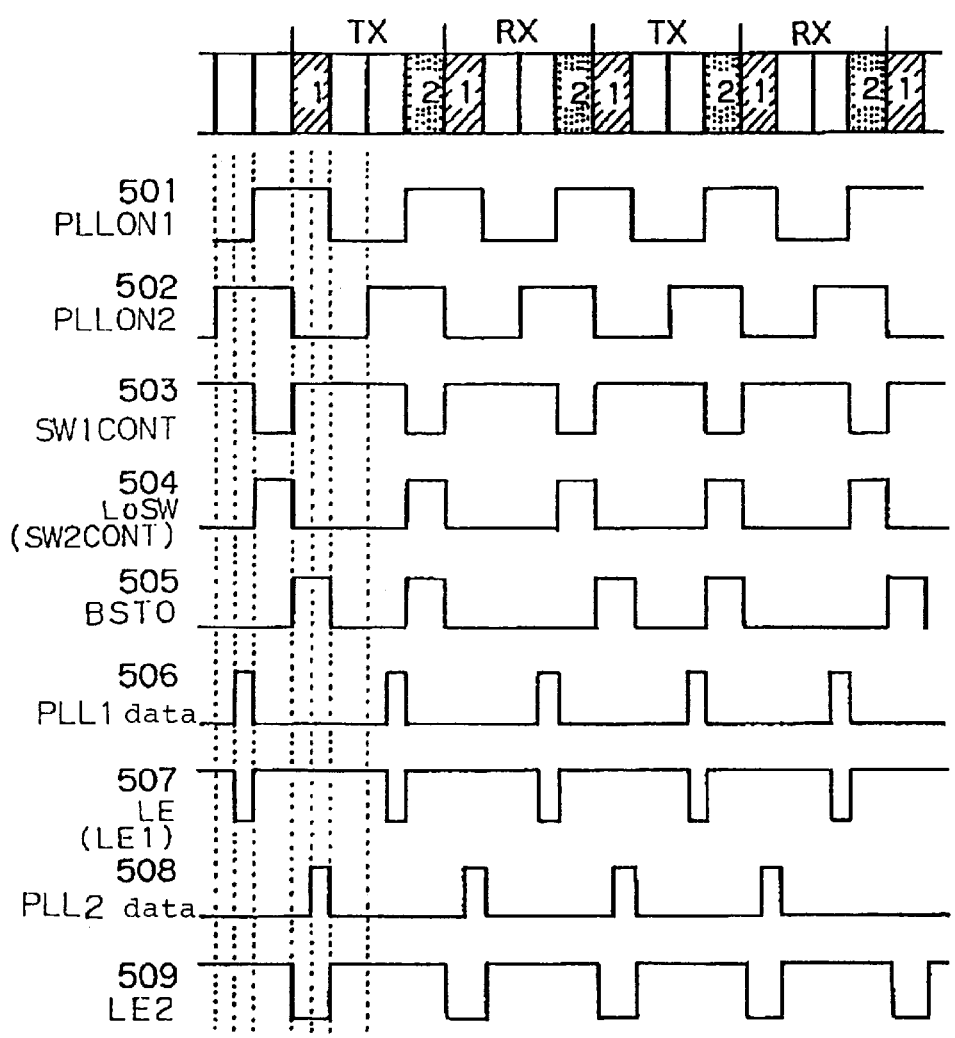
FIG. 6 is a timing chart when the transmission slot interval is 2 slots.

On the other hand, operation of transmitting every other slot is executed in accordance with a timing chart of FIG. 5. The operation here is substantially the same as the operation of FIG. 4 except that operations of PLL ON1 401 and PLL ON2 402 are different. However, the timing of PLL2 data 408 is later by a 1.5 slot interval after PLL1 data 406.

As described above, since the present invention makes positive use of an LE function of a PLL IC and makes it possible to set frequency data of two PLL ICs with a single data output of a modem IC by displacing the data set timings from each other on the time base, there is an advantage that an increase of the number of output terminals of the modem IC can be prevented.

Accordingly, an increase of the number of output terminals of the modem IC by adaptation for 2-slot transmission/reception can be minimized.

Furthermore, with the present invention, since the number of control lines to the PLL ICs is reduced, higher density mounting of circuit elements on a printed circuit board can be achieved.

Besides, since the number of control lines to the PLL ICs is reduced, where the PHS terminal is constructed such that a radio unit is mounted on a sub board and connected to a main board by a connector, there is an advantage also in that the number of terminals required for the connector can be reduced.

It is to be noted that, while, in the embodiment described above, an invertor is used solely for the SW1CONT for the 1st local switch and a NAND circuit is used solely for the LE2, they may be incorporated in the PLL frequency synthesizer IC2.

What is claimed is:

1. A plural synthesizer controlling system for a personal handyphone system which comprises an antenna unit, a receiver, a transmitter, a local unit, a modem IC, and a CPU for processing data supplied thereto from said receiver through said modem IC and performs 1-frame 2-slot transmission/reception;

said modem IC comprising means for setting frequency data to be used for transmission/reception to said local unit;

said local unit comprising:
a first 1st local VCO;
a second 1st local VCO;
a 2nd local VCO;
a 1st local switch for alternately outputting local inputs from said first 1st local VCO and said second 1st local VCO for each slot;
a first PLL frequency synthesizer IC for controlling said first 1st local VCO and said 2nd local VCO with a frequency set data from said modem IC;
a second PLL frequency synthesizer IC for controlling said second 1st local VCO with the frequency set data from said modem IC;
an invertor for inverting a local switch output of said modem IC and inputting an inverted signal to a switch control of said 1st local switch; and
a NAND circuit for NANDing an output of said invertor and an output of said modem IC for switching power supply to said first PLL frequency synthesizer ON and inputting a NAND signal to a second latch enable terminal through which said second PLL frequency synthesizer IC controls writing of the frequency set data.

2. A plural synthesizer controlling system for a personal handyphone system according to claim 1, wherein said modem IC further comprises means connected to said first PLL frequency synthesizer IC and said second PLL frequency synthesizer IC, for controlling a first latch enable terminal through which said first PLL frequency synthesizer IC controls writing of the frequency set data and a second latch enable terminal through which said second PLL frequency synthesizer IC controls writing of the frequency set data, making a write timing of the frequency set data different between said first PLL frequency synthesizer IC and said second PLL frequency synthesizer IC to allow writing of the frequency set data into said first PLL frequency synthesizer IC and said second PLL frequency synthesizer IC to be performed through a same control line, and producing a control signal to said second latch enable terminal from other control signal by using said invertor and said NAND circuit.

3. A plural synthesizer controlling system for a personal handyphone system according to claim 2, further comprising means for writing, as a write timing of the frequency set data, the frequency set data into said first PLL frequency synthesizer IC before a signal for switching the power supply to said first PLL frequency synthesizer IC ON is controlled to a high level, and writing the frequency set data into said second PLL frequency synthesizer IC before a signal for switching the power supply to said second PLL frequency synthesizer IC ON is controlled to a high level.

4. A plural synthesizer controlling method for a plural synthesizer controlling system for a personal handyphone system according to claim 1, comprising the steps of:

inverting the local switch output of said modem IC by said invertor and inputting the inverted signal to the switch control of said 1st local switch;

NANDing the output of said invertor and the output of said modem IC for switching the power supply to said first PLL frequency synthesizer ON by said NAND circuit and inputting the NAND signal to the second latch enable terminal through which said second PLL frequency synthesizer IC controls writing of the frequency set data;

setting frequency data to be used for transmission/reception to said local unit by said modem IC;

controlling said first 1st local VCO and said 2nd local VCO with the frequency set data from said modem IC by said first PLL frequency synthesizer IC;

controlling said second 1st local VCO with the frequency set data from said modem IC by said second PLL frequency synthesizer IC; and alternately outputting the local inputs from said first 1st local VCO and said second 1st local VCO for each slot by said 1st local switch.

5. A plural synthesizer controlling method for a plural synthesizer controlling system for a personal handyphone system according to claim 4, further comprising the steps performed by said modem IC of:

controlling a first latch enable terminal through which said first PLL frequency synthesizer IC controls writing of the frequency set data and the second latch enable terminal through which said second PLL frequency synthesizer IC controls writing of the frequency set data, making a write timing of the frequency set data different between said first PLL frequency synthesizer IC and said second PLL frequency synthesizer IC to allow writing of the frequency set data into said first PLL frequency synthesizer IC and said second PLL frequency synthesizer IC to be performed through a same control line, and producing a control signal to said second latch enable terminal from other control signals by using said invertor and said NAND circuit.

6. A plural synthesizer controlling method for a plural synthesizer controlling system for a personal handyphone system according to claim 5, further comprising the steps of:

as a write timing of the frequency set data, writing the frequency set data into said first PLL frequency synthesizer IC before a signal for switching the power supply to said first PLL frequency synthesizer IC ON is controlled to a high level; and writing the frequency set data into said second PLL frequency synthesizer IC before a signal for switching the power supply to said second PLL frequency synthesizer IC ON is controlled to a high level.

* * * * *